(12) United States Patent
Liew (10) Patent No.: US 8,716,661 B1
(45) Date of Patent: May 6, 2014

(54) METHOD FOR MEASURING SIZE OF SPECIMEN

(71) Applicant: Inotera Memories, Inc., Taoyuan (TW)

(72) Inventor: San Lin Liew, Taipei (TW)

(73) Assignee: Inotera Memories, Inc., Hwa-Ya Technology Park Kueishan, Taoyuan (TW)

( * ) Notice: Subject to any disclaimer, the term of this patent is extended or adjusted under 35 U.S.C. 154(b) by 0 days.

(21) Appl. No.: 13/831,763

(22) Filed: Mar. 15, 2013

(30) Foreign Application Priority Data

Feb. 6, 2013 (TW) ............................. 102104626 A (51) Int. Cl.
*H01J 37/28* (2006.01)

(52) U.S. Cl.
CPC ...................................... *H01J 37/28* (2013.01)
USPC ............ 250/307; 250/306; 250/310; 250/311

(58) Field of Classification Search
CPC ....................................................... H01J 37/28
USPC .................................. 250/306, 307, 310, 311
See application file for complete search history.

(56) References Cited

U.S. PATENT DOCUMENTS

| | | | | |
|---|---|---|---|---|
| 5,350,921 A | * | 9/1994 | Aoyama et al. ................ | 250/311 |
| 5,650,621 A | * | 7/1997 | Tsuneta et al. ................ | 250/311 |
| 5,767,516 A | * | 6/1998 | Kawanami et al. ............ | 250/311 |
| 6,646,737 B2 | * | 11/2003 | Tortonese et al. .......... | 356/243.4 |
| 6,686,600 B2 | | 2/2004 | Sadayama | |
| 7,173,268 B2 | * | 2/2007 | Tanaka et al. ............. | 250/559.19 |
| 7,214,935 B2 | | 5/2007 | Bauer | |
| 7,459,712 B2 | * | 12/2008 | Tanaka et al. ............... | 250/559.4 |
| 7,619,218 B2 | * | 11/2009 | Nakano et al. ................ | 250/306 |
| 8,170,832 B2 | * | 5/2012 | Young et al. .................. | 702/170 |
| 8,232,523 B2 | * | 7/2012 | Boughorbel et al. ......... | 250/307 |
| 8,338,782 B2 | * | 12/2012 | Luecken et al. .............. | 250/311 |
| 8,431,891 B2 | * | 4/2013 | Shichi et al. ................ | 250/306 |
| 8,440,970 B2 | * | 5/2013 | Zewail .......................... | 250/307 |
| 8,536,525 B2 | * | 9/2013 | Blackwood et al. .......... | 250/304 |
| 8,586,921 B2 | * | 11/2013 | Boughorbel et al. ......... | 250/310 |
| 2007/0120078 A1 | * | 5/2007 | Tanaka et al. ............... | 250/559.4 |
| 2008/0268557 A1 | * | 10/2008 | Liang et al. ..................... | 438/16 |
| 2008/0276695 A1 | * | 11/2008 | Prater et al. ..................... | 73/105 |
| 2010/0116977 A1 | * | 5/2010 | Young et al. ................. | 250/252.1 |
| 2011/0006207 A1 | * | 1/2011 | Arjavac et al. ................ | 250/307 |
| 2011/0233403 A1 | * | 9/2011 | Own et al. ..................... | 250/311 |
| 2012/0187285 A1 | * | 7/2012 | Young et al. ................ | 250/252.1 |
| 2012/0292503 A1 | * | 11/2012 | Phifer et al. .................. | 250/307 |
| 2013/0146764 A1 | * | 6/2013 | Own et al. ..................... | 250/307 |
| 2013/0234023 A1 | * | 9/2013 | Zewail .......................... | 250/307 |

\* cited by examiner

*Primary Examiner* — David A Vanore (74) *Attorney, Agent, or Firm* — Winston Hsu; Scott Margo (57) ABSTRACT

A method for measuring a size of a specimen is provided. A first projected width of the specimen is obtained at a first angle with the help of an energy source then a second projected width of the specimen is obtained at a second angle with the help of the energy source. The first projected width, the first angle, the second projected width and the second angle are co-related to indirectly obtain a size of the specimen which has not been measured. The un-measured size is not directly involved with the first projected width and the second projected width.

19 Claims, 7 Drawing Sheets

METHOD FOR MEASURING SIZE OF SPECIMEN

BACKGROUND OF THE INVENTION

1. Field of the Invention

The present invention generally relates to a method of measuring a size. In particular, the present invention is directed to a method of indirectly measuring a size through a dimension independent of the size to be measured without destroying the sample. The method of the present invention is particularly suitable for measuring a sample with an extremely small size.

2. Description of the Prior Art

In the field of manufacturing a semiconductor element, it is often necessary to measure the size of the structural dimensions of products or semi-finished products in the manufacturing process. With the shrinkage the critical dimension of the semiconductor elements, for example less than 10 nm, it is a growing challenge to measure the very small size of the structural dimensions of products or semi-finished products. Meanwhile, the samples with the size to be measured also become smaller and smaller as the critical dimension of the semiconductor elements becomes smaller so the samples are more difficult to fabricate. There are some known methods to measure the size of a sample.

For example, for transmission electron microscopy (TEM), the first method involves a scanning electron microscope (SEM) but this method has numerous disadvantages. First, this method requires a scanning electron microscope. Second, this method requires a sample to be removed from one apparatus (in this example, a transmission electron microscope) to another apparatus (in this example, a scanning electron microscope), which takes too much waiting time. Moreover, each transfer of a sample will increase the risk of damage. Further, in order to manufacture a suitable sample for use in a scanning electron microscope, part of the sample is destroyed, which is not suitable for later inspection.

The second method is called a convergent electron beam diffraction (CBED) method. However, the disadvantage of this method resides in the use of non-traditional or advanced transmission electron microscopy analysis techniques, usually involving special software to analyze the data, and is not suitable for the sample thickness which is not thick enough, for example, it is not suitable for the measurement of a sample with a sample size less than 45 nm.

The third method is called an energy filter type transmission electron microscopy (EFTEM) method. But the problem is that, the result obtained in this method is the ratio of "thickness to size" $t/\lambda$ ($\lambda$ is the mean free path of the sample), rather than the thickness value per se. Additional hardware accessories are also needed in addition to a standard transmission electron microscope (TEM), and an advanced one is used in conjunction with transmission electron microscope operating techniques, which not suitable for general occasions.

In the light of the aforementioned commonly used methods, they cannot provide a method which is a simple, fast and direct operation. Therefore, a novel method is still need to simplify the measurement of a sample size.

SUMMARY OF THE INVENTION

In view of this, the present invention therefore proposes a method to indirectly measure a size of a sample by means of a dimension independent of the size to be measured. The method of the present invention is able to indirectly measure a size of a sample by using a standard traditional transmission electron microscope without destroying or damaging the sample. The method of the present invention not only avoids the drawbacks of the prior art, but also is suitable for measuring a sample with a minimal structure size, and preferably, the smaller the structural dimensions the better the applications.

Given the above, the present invention proposes a method for measuring a size. First, a measuring apparatus with a sample is provided. The sample has a size to be measured, and the measuring apparatus has a first apparatus parameter and a second apparatus parameter which both are adjustable. Second, the first apparatus parameter of the measuring apparatus is so well adjusted with the help of an energy source, to obtain a first optimized value corresponding to the first apparatus parameter. Then, the second apparatus parameter of the measuring apparatus is also well adjusted with the help of the energy source, to obtain a second optimized value corresponding to the second apparatus parameter. Next, the first optimized value, the first apparatus parameter, the second optimized value and the second apparatus parameter are co-related, to indirectly obtain the size to be measured.

In one embodiment of the present invention, the size to be measured of the sample is less than 100 nanometers (nm).

In another embodiment of the present invention, the size to be measured of the sample is a structural size.

In another embodiment of the present invention, at least one of the first apparatus parameter and the second apparatus parameter is an angle.

In another embodiment of the present invention, the size to be measured is obtained by using the following formula:

the size to be measured=(the second optimized value−the first optimized value×cos (the second apparatus parameter−the first apparatus parameter))/sin (the second apparatus parameter−the first apparatus parameter).

In another embodiment of the present invention, both the second optimized value and the first optimized value are independent of the size to be measured.

In another embodiment of the present invention, the energy source is at least one of an electron beam and an electromagnetic wave.

In another embodiment of the present invention, the sample is not destroyed or damaged when the second optimized value and the first optimized value are obtained and when the size to be measured are indirectly obtained.

In another embodiment of the present invention, both the second apparatus parameter and the first apparatus parameter are default values.

The present invention also proposes another method for measuring the thickness of a sample. First, a sample with a size to be measured is provided. Second, a first projection width of the sample at a first angle is obtained with the help of an energy source. Then, a second projection width of the sample at a second angle is obtained with the help of the energy source. Then, the first projection width, the first angle, the second projection width and the second angle are co-related, to indirectly obtain the size to be measured.

In one embodiment of the present invention, the size to be measured of the sample is less than 45 nanometers (nm).

In another embodiment of the present invention, the size to be measured of the sample is a structural size.

In another embodiment of the present invention, the size to be measured is obtained by using the following formula:

the size to be measured=(the second projection width−the first projection width×cos (the second angle−the first angle))/sin (the second angle−the first angle).

In another embodiment of the present invention, the energy source is at least one of an electron beam and an electromagnetic wave.

In another embodiment of the present invention, the sample is not destroyed or damaged when the second projection width and the first projection width are obtained as well as when the size to be measured are indirectly obtained.

In another embodiment of the present invention, both the second angle and the first angle are default values.

In another embodiment of the present invention, both the second projection width and the first projection width are optimized values.

In another embodiment of the present invention, the second angle is not greater than 15 degrees.

In another embodiment of the present invention, a transmission electron microscope (TEM) is used to obtain the second projection width and the first projection width.

In another embodiment of the present invention, the difference of the first angle and the second angle depends on the operational limits of the TEM holder. If a standard TEM holder is used, the difference of the first angle and the second angle is not more than 15 degrees. If a non-standard TEM holder, such as a tomography holder, is used, the difference of the first angle and the second angle may be greater than 15 degrees, but generally not more than 75 degrees.

These and other objectives of the present invention will no doubt become obvious to those of ordinary skill in the art after reading the following detailed description of the preferred embodiment that is illustrated in the various figures and drawings.

DETAILED DESCRIPTION

The present invention particularly provides a method to indirectly measure a sample size by means of obtaining the dimension independent of the size to be measured. FIG. 1 to FIG. 7 illustrate the method of the present invention to indirectly measure the sample size by means of obtaining the dimension independent of the size to be measured, such as the dimension of thickness. First, please refer to FIG. 1, a sample 100, and a measuring apparatus 200 for the measurement of the sample size are provided. The measuring apparatus 200 has a viewfinder 210. The sample 100 has a size to be measured, usually in the range of nano-scale. For example, the sample 100 has a size less than 100 nanometers (nm) to be measured, preferably the size to be measured is less than 45 nm, the smaller the better. The sample 100 may be semi-finished or finished products with a size to be measured, for example, an element on a semiconductor substrate (not shown). Such element has a variety of material layers and structural dimensions. During the manufacturing process, it is needed to find out whether the dimensions of thickness, width, length, etc. of the various material layers are correct, or whether the structural dimensions of the element meet their expected specifications, neither too big nor too small.

Figure 1:
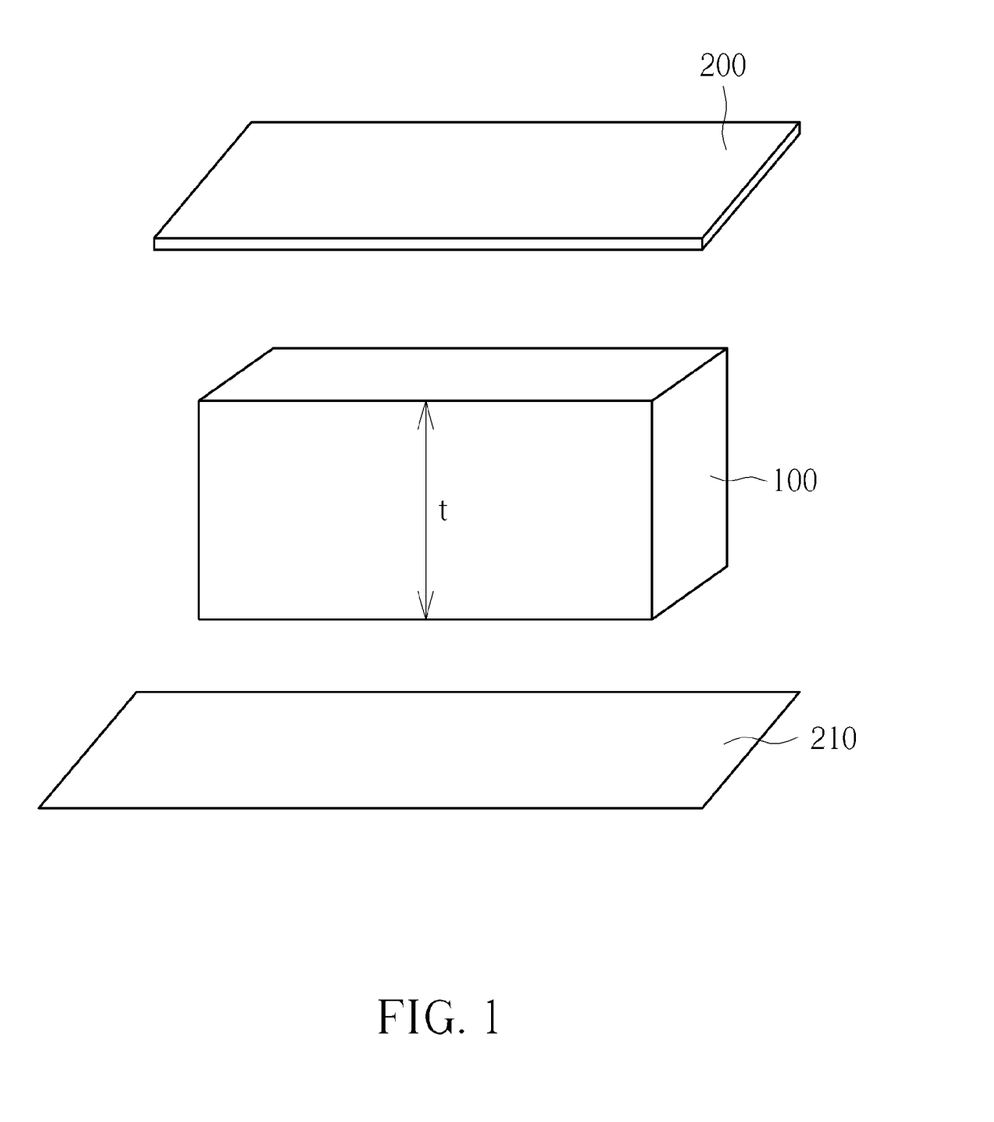
FIG. 1 to FIG. 7 illustrate the method of the present invention to indirectly measure the sample size by means of obtaining the dimension independent of the size to be measured.

The measuring apparatus 200 may be an apparatus for use in measuring the dimensions, such as a conventional transmission electron microscope, without the need to install special software or new hardware. The measuring apparatus 200 has adjustable parameters, in other words, the measuring apparatus 200 has adjustable parameters with respect to the sample 100. These parameters may be adjusted by adjusting the measuring apparatus 200 itself or by adjusting the sample 100. Only basic operating techniques are needed to adjust the parameters and the results are observed through the viewfinder 210.

The adjustable parameters may be an angle. For example, the adjustable parameters may be the viewing angle or the holder angle of the measuring apparatus 200. In addition, the adjustable parameters may also be a tilt angle of the sample 100 to the measuring apparatus 200. In this way, difference measurement results are obtained by changing these adjustable parameters. Preferably, the adjustable parameters are well adjusted to become a first apparatus parameter and a second apparatus parameter, to yield different measurement results.

Figure 2:
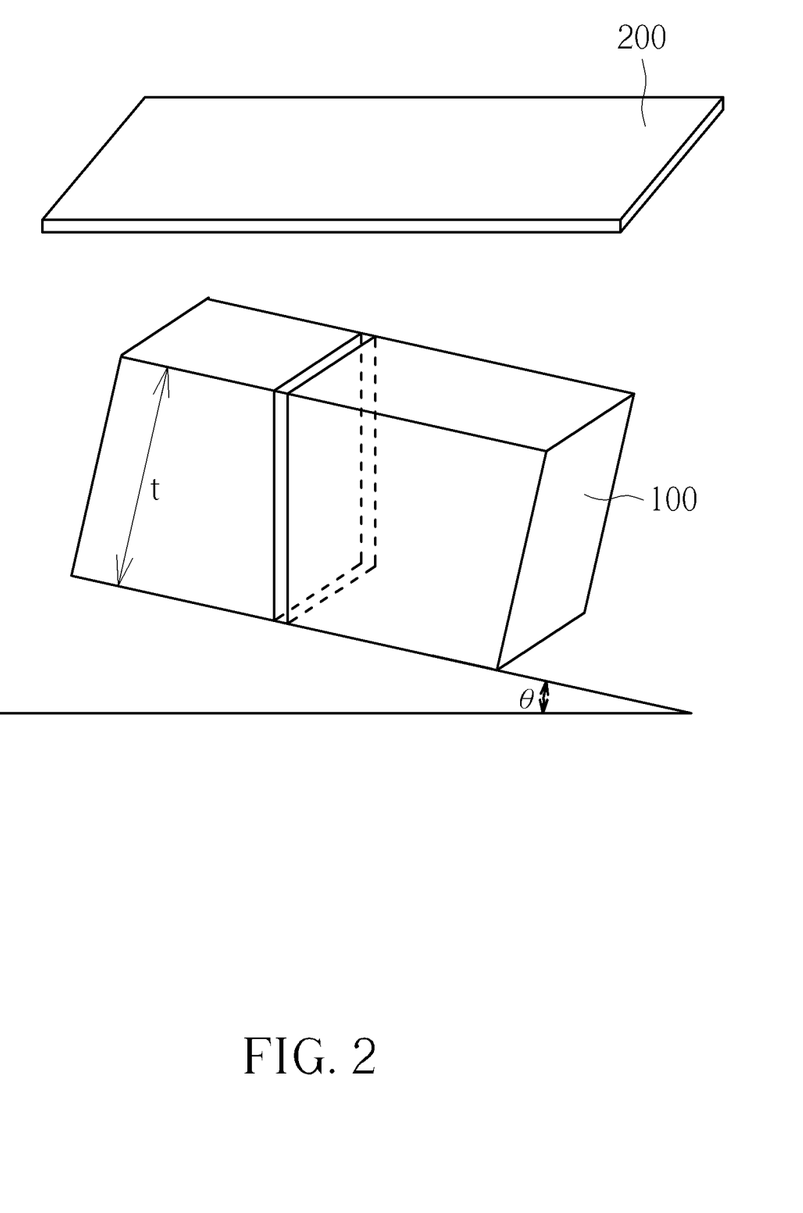

Second, please refer to FIG. 2, the first apparatus parameter of the measuring apparatus 200 or of the sample 100 is adjusted to obtain a first value corresponding to the first apparatus parameter, and the first value may be a first optimized value after an optimizing step. Generally there may be numerous components arranged and disposed on a substrate and it is highly possible that adjacent components may interfere with the process of adjusting the first apparatus parameter of the measuring apparatus 200 during the process of adjusting the first apparatus parameter of the measuring apparatus 200, so an optimizing step may be optionally needed to fine-tune the value of the first apparatus parameter, for example, a slight adjustment such as increase or decrease the viewing angle, the holder angle, or the tilt angle θ of the sample to the measuring apparatus 200, in order to obtained the first apparatus parameter which is suitable for the analysis.

Figure 3:
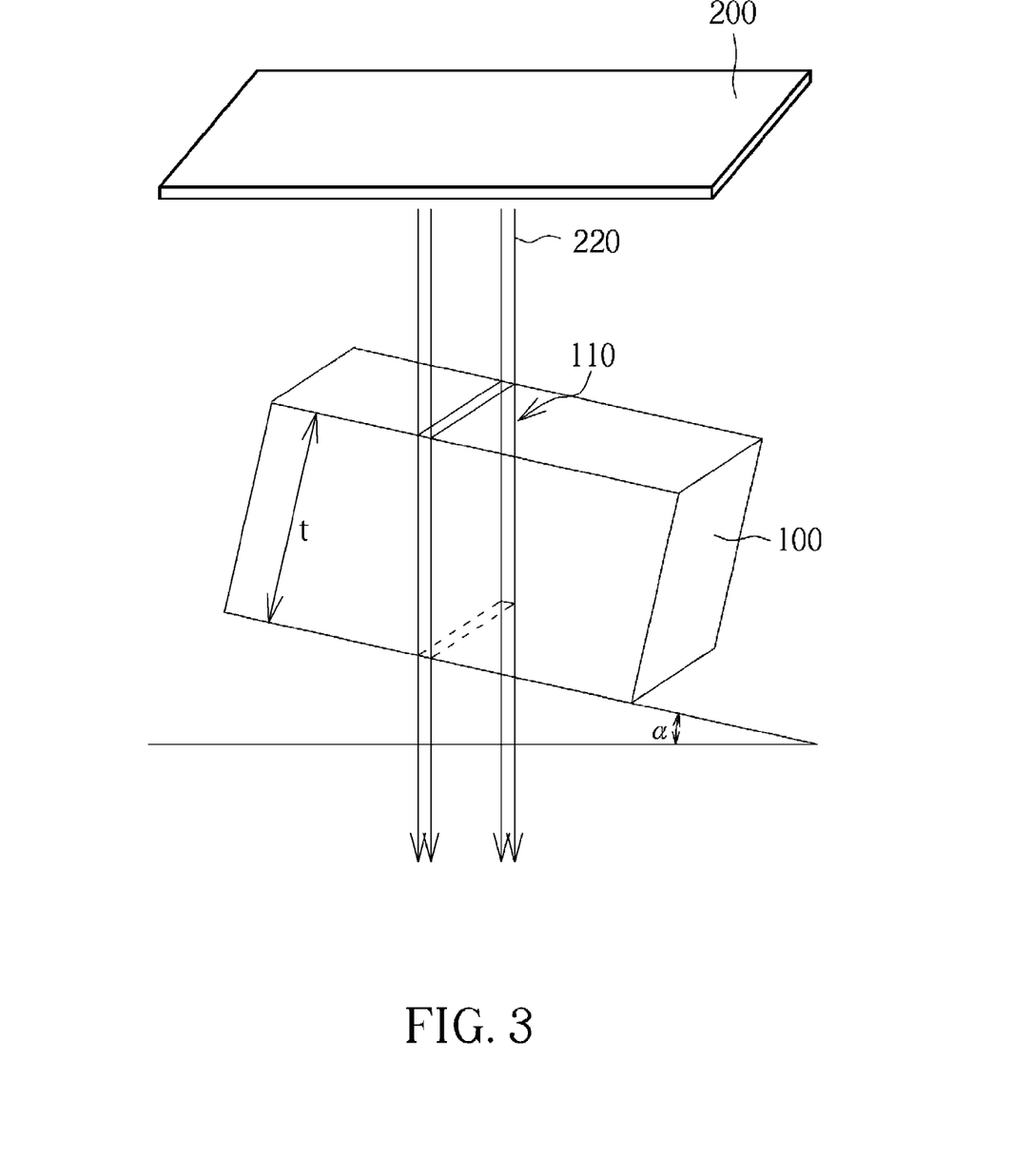

Preferably, please refer to FIG. 3, a first optimized value is obtained after the first apparatus parameter of the sample 100, such as the tilt angle θ of the sample 100 to the measuring apparatus 200, in the measuring apparatus 200 is so well adjusted with the help of an energy source 220. The energy source 220 interacts with the sample 100 to obtain data good for the analysis. Such energy source may be an electron beam, for example a converged or a parallel electron beam, an electromagnetic wave or the combination thereof. In particular, the use of such energy source does not damage or destroy the sample 100. Preferably, the first apparatus parameter of the measuring apparatus 200 is an apparatus parameter when the sample structure 110 is parallel with the energy source 220 of the measuring apparatus 200.

Figure 4:
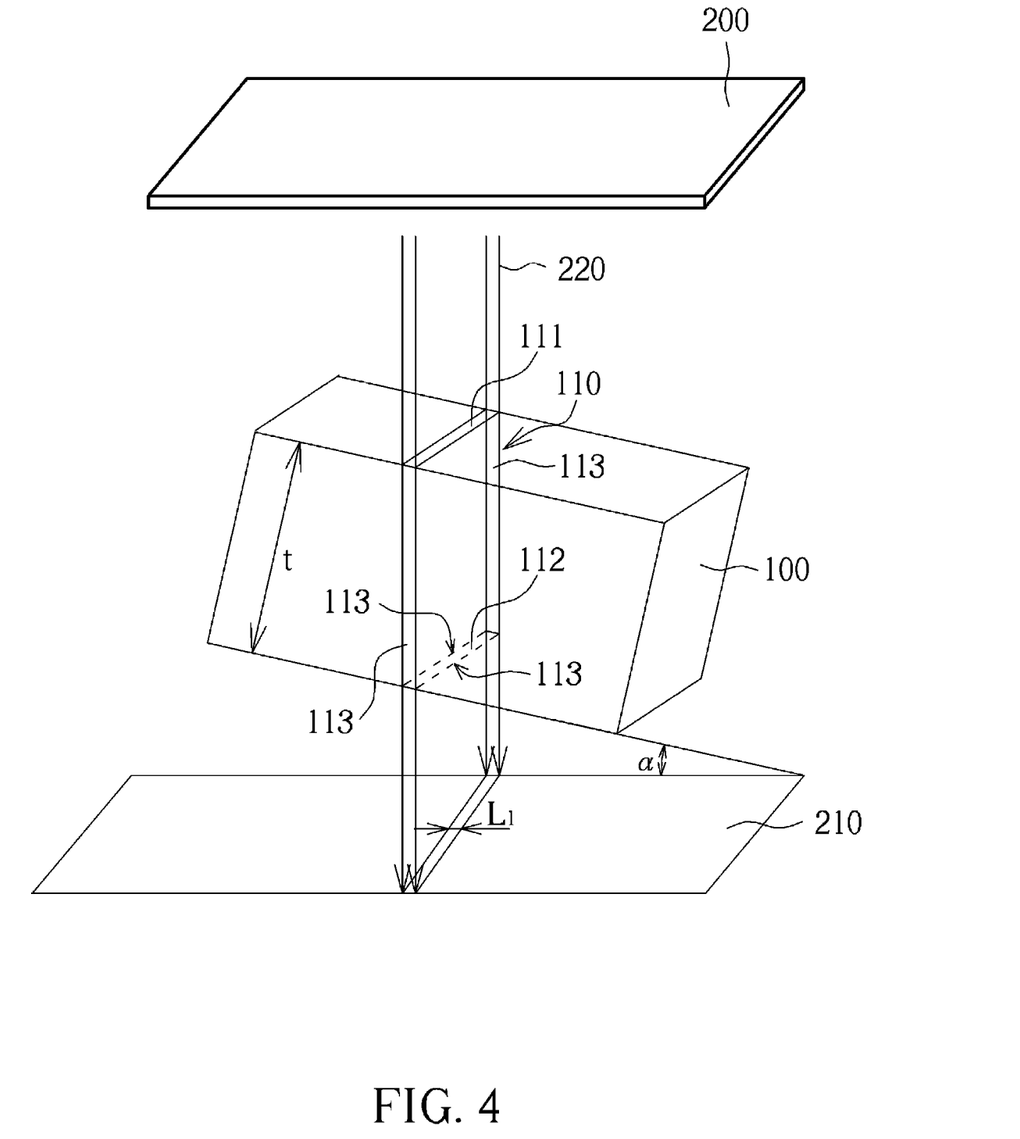

For example, please refer to FIG. 4, the first angle α of the sample 100 in the measuring apparatus 200 is adjusted in the presence of the energy source 220 so that the sample structure 110 is parallel with the energy source 220 of the measuring apparatus 200. The dimension of the sample structure 110 parallel with the energy source 220 of the measuring apparatus 200 is usually a dimension 113 parallel with the planes other than the light-incoming plane 111 or the light-outgoing plane 112 of the sample structure 110. Because the target in the sample structure 110 is parallel with the energy source 220 of the measuring apparatus 200, overlapped images which potentially interfere with the observations of the projection width of the sample 100 are avoided.

For example, a transmission electron microscope is used to observe the first projection width $L_1$ of the sample through the view finder 210. At this time, the obtained data include the first optimized value α and the first projected width $L_1$ which corresponds to the first optimized value α. The first optimized value α is read from the scale ruler of the apparatus, and the first projection width $L_1$ is the projected image of the sample structure 110 in the transmission electron microscope and obtained from the viewfinder 210, as shown in FIG. 4.

Figure 5:
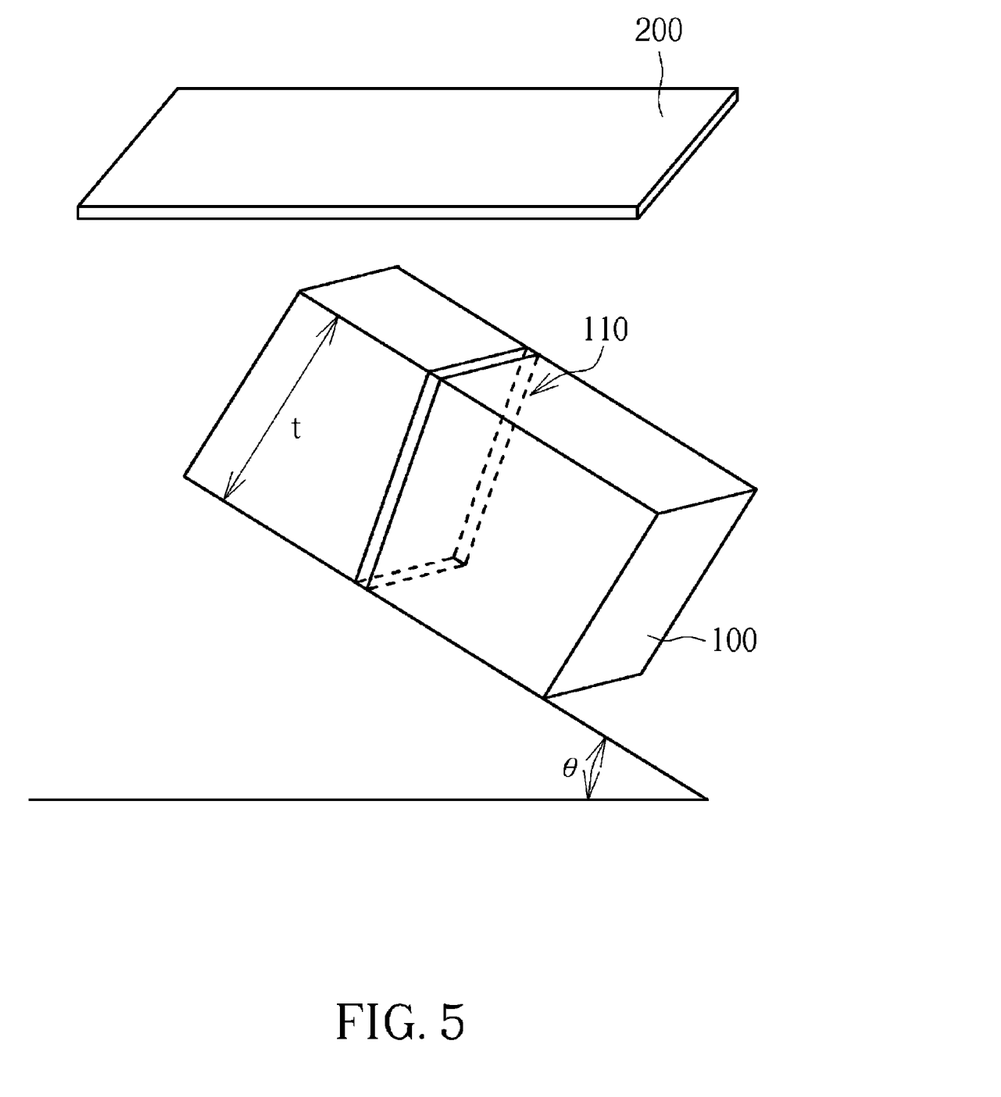
Figure 6:
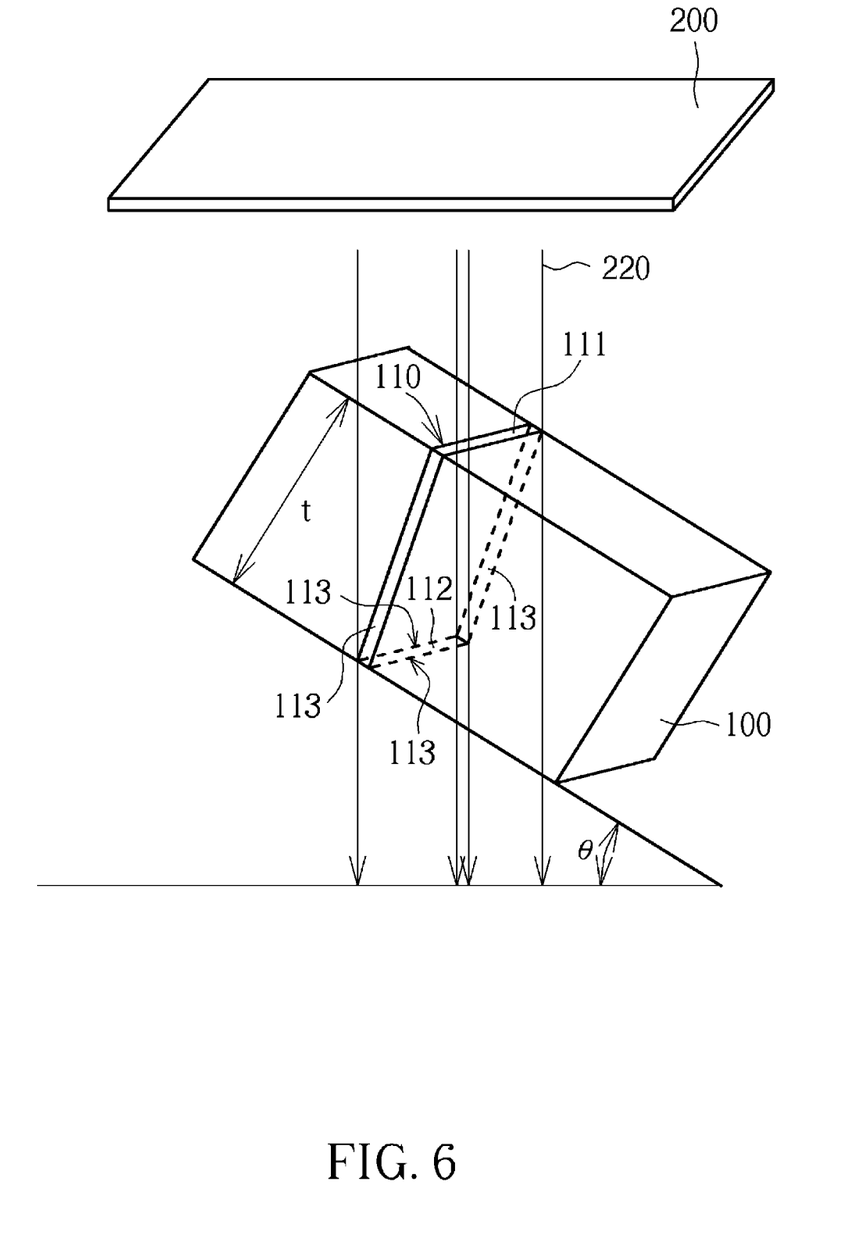

Then, please refer to FIG. 5, the parameter of the sample 100 in the measuring apparatus 200 is adjusted again to become another one, for instance, a second apparatus parameter different from the first apparatus parameter. For example, please refer to FIG. 6, the apparatus parameter of the sample 100 in the measuring apparatus 200 is adjusted to be a second apparatus parameter in the presence of the energy source 220, to obtain a second optimized value corresponding to the second apparatus parameter. Please refer to FIG. 7, a transmission electron microscope is used to obtain the second projection width $L_2$ of the sample 100 through the view finder 210 at a second angle $\beta$ with the help of the energy source 220. The difference of the first angle $\alpha$ and the second angle $\beta$ of a sample depends on the operational limits of the TEM holder. In one aspect, if a standard TEM holder is used, the difference of the first angle $\alpha$ and the second angle $\beta$ may be not more than 15 degrees. In another aspect, if a non-standard TEM holder, such as a tomography holder, is used, the difference of the first angle $\alpha$ and the second angle $\beta$ may be greater than 15 degrees, but generally not more than 75 degrees. In order to facilitate the measurement, the method of the present invention also includes to set both the second apparatus parameter and the first apparatus parameter to be default values, thereby saving the time for the need to fine-tune both the second apparatus parameter and the first apparatus parameter. In other words, both the first angle $\alpha$ and the second angle $\beta$ of the measuring apparatus 200 may be the default values.

Figure 7:
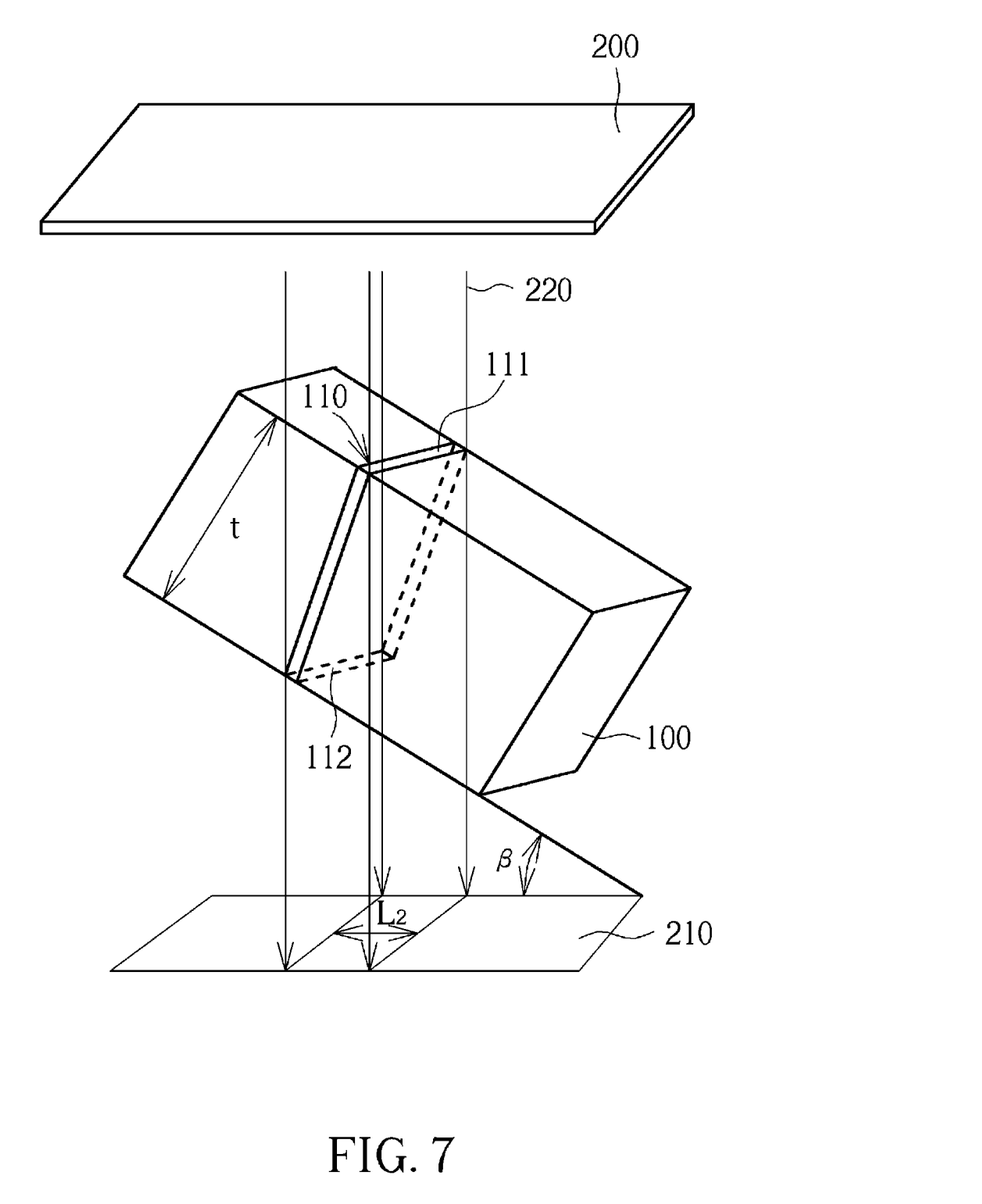

Because there may be various elements arranged and disposed on the substrate and it is highly possible that adjacent components may interfere with the process of adjusting the apparatus parameters of the measuring apparatus 200 during the process of adjusting the apparatus parameters of the measuring apparatus 200, an optimizing step may be optionally needed to fine-tune the value of the second apparatus parameter. For example, the elements on the semiconductor substrate may usually include many material layers and microscopic structures. The material layer may be a nitride layer, an oxide layer, or a silicide layer . . . etc. The microscopic structure may be a gate, contact plugs, and each has a distinct dimensional size, for example, a thickness t, a length, a width, a height etc . . . as shown in FIG. 7. In the process of manufacturing a semiconductor element, it is often needed to measure whether the structural dimensions of the semi-finished and finished products in production meet expectations.

However, because the elements are typically tightly arranged on a semiconductor substrate, the adjacent material layers and microscopic structures may mutually interfere with one another in the process of measuring the dimensional size so a good analysis is accordingly not always possible. Preferably, when there is a good contrast between the adjacent sample structures and the first projected image as well as the second projected image of the sample 100 from the viewfinder 210, it is possible to obtain clean and sharp first projection width $L_1$ and the second projection wide $L_2$. Of course, the tilt angle $\theta$, namely $\alpha$, is not equal to the previous tilt angle $\theta$, namely $\beta$. Preferably, an optimizing step may be optionally needed to fine-tune the value of the second apparatus parameter, for example, a slight adjustment such as increase or decrease the viewing angle, the holder angle, or the tilt angle $\theta$ of the sample to the measuring apparatus 200, in order to obtain a good second apparatus parameter which is suitable for the analysis. Preferably, both the first projection width $L_1$ and the second projection width $L_2$ are fine-tuned optimized values.

Because the semiconductor substrate, such as silicon (Si), gallium arsenide (GaAs), gallium nitride (GaN), aluminum gallium arsenide (AlGaAs) all are crystalline materials, the tilt angle $\theta$ of the sample to the measuring apparatus 200 is adjusted in accordance with the periodic features of the atomic lattice structure of the semi-conductive materials when the first apparatus parameter of the sample 100 in the measuring apparatus 200 is adjusted. The first apparatus parameter of the sample 100 in the measuring apparatus 200 is preferably the apparatus parameter when the sample structure 110 is parallel with the energy source 220 of the measuring apparatus 200. For example, if the sample 100 is a widely used semi-conductive substrate of [100] lattice structure, preferably the sample is adjusted to [110] or [100] zone axis so that the sample structure 110 is parallel with the energy source 220 of the measuring apparatus 200. Then, a transmission electron microscope is used to observe the first projection width $L_1$ of the sample 100 through the view finder 210 at the first angle $\alpha$ in the presence of the energy source 220. At this moment, because the sample structure 110 is parallel with the energy source 220 of the measuring apparatus 200, the first projection width $L_1$ is not interfered by adjacent material layers or nearby microscopic structures.

When the second apparatus parameter in the measuring apparatus 200 is adjusted, the sample structure 110 also aligns with the zone axis or Kikuchi lines in accordance with the periodic features of the atomic lattice structure of the semi-conductive materials. Preferably, except the change of the tilt angle $\theta$ of the sample 100 to the measuring apparatus 200, any other variant (apparatus parameter) is not changed.

Preferably as shown in FIG. 7, when the first optimized value, the second optimized value and the indirectly measured dimension t are obtained in accordance with the method of the present invention, the sample 100 to be measured is not damaged or destroyed. In addition, since the first optimized value and the second optimized value are independent of the dimension 't' to be measured, the method of the present invention is directed to a procedure to indirectly determine a size to be measured.

After the first apparatus parameter, the first optimized value, the second apparatus parameter and the second optimized value are obtained, it is possible to integrate the first apparatus parameter, the first optimized value, the second apparatus parameter and the second optimized value in a simple way to indirectly obtain, namely to calculate, the size to be measured. The obtained result is straightforwardly the size to be measured, rather than a ratio, for example, an indirect answer (t/λ). If the first apparatus parameter and the second apparatus parameter are angles, the following formula may be used to give the size to be measured:

the size to be measured=(the second optimized value−the first optimized value×cos (the second apparatus parameter−first apparatus parameter))/sin (the second apparatus parameter−the first apparatus parameter)

For example, after using the aforementioned approaches to obtain the first angle $\alpha$, the first projection width $L_1$, the second angle $\beta$ and the second projection width $L_2$, the first angle $\alpha$, the first projection width $L_1$, the second angle $\beta$ and the second projection width $L_2$ can be co-related to indirectly give the size to be measured by referring to the following formula. Preferably, $L_1$ is smaller while $L_2$ is bigger, but both $L_1$ and $L_2$ are not larger than t. Or alternatively, the difference between $L_2$ and $L_1$ is the larger the better, and $L_1$ is smaller than 15 nm.

the size to be measured t={$L_2$−[$L_1$×cos (β−α)]}/sin β−α), wherein β>α.

The following examples are given to show how the thickness dimension size 't' of the sample can be accurately and indirectly determined.

First Example $L_1$=12.9 nm, $L_2$=19.4 nm, β=11.35°, α=1.35°, β−α=11°
The size t to be measured=35 nm
The result given by using a scanning electron microscopy: between the range of approximately 36-38 nm
The result shows that the size deduced by using the method of the present invention is very close to the result verified by a direct measurement.

Second Example $L_1$=5.7 nm, $L_2$=19.7 nm, β=12.76°, α=1.76°, β−α=11°
The size t to be measured=74 nm Third Example $L_2$=9.5 nm, $L_1$=23.7 nm, β=11.90°, α=0.75°, β−α=11.2°
The size t to be measured=74 nm
As seen from the above examples, the present invention provides a very simple and quick way to accurately obtain a size of a sample.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of measuring a size, comprising:
providing a measuring apparatus with a sample, wherein said sample has a size to be measured, and said measuring apparatus has a first apparatus parameter and a second apparatus parameter which are adjustable;
adjusting said first apparatus parameter of said measuring apparatus in the presence of an energy source, to obtain a first optimized value corresponding to said first apparatus parameter;
adjusting said second apparatus parameter of said measuring apparatus in the presence of said energy source, to obtain a second optimized value corresponding to said second apparatus parameter; and
co-relating said first optimized value, said first apparatus parameter, said second optimized value and said second apparatus parameter, to indirectly obtain said size to be measured.

2. The method of measuring a size of claim 1, wherein said size to be measured of said sample is less than 100 nanometers (nm).

3. The method of measuring a size of claim 1, wherein said size to be measured of said sample is a structural size.

4. The method of measuring a size of claim 1, wherein at least one of said first apparatus parameter and said second apparatus parameter is an angle.

5. The method of measuring a size of claim 4, wherein said size to be measured is obtained by:

said size to be measured=(said second optimized value−said first optimized value×cos (said second apparatus parameter−said first apparatus parameter))/sin (said second apparatus parameter−said first apparatus parameter).

6. The method of measuring a size of claim 1, wherein both said second optimized value and said first optimized value are independent of said size to be measured.

7. The method of measuring a size of claim 1, wherein said energy source is at least one of an electron beam and an electromagnetic wave.

8. The method of measuring a size of claim 1, wherein said sample is not destroyed when said second optimized value and said first optimized value are obtained and when said size to be measured are indirectly obtained.

9. The method of measuring a size of claim 1, wherein both said second apparatus parameter and said first apparatus parameter are default values.

10. A method for measuring the thickness of a sample, comprising:
providing a sample with a size to be measured;
obtaining a first projection width of said sample at a first angle in the presence of an energy source;
obtaining a second projection width of said sample at a second angle in the presence of said energy source; and
co-relating said first projection width, said first angle, said second projection width and said second angle, to indirectly obtain said size to be measured.

11. The method for measuring the thickness of a sample of claim 10, wherein said size to be measured of said sample is less than 45 nanometers (nm).

12. The method for measuring the thickness of a sample of claim 10, wherein said size to be measured of said sample is a structural size.

13. The method for measuring the thickness of a sample of claim 10, wherein said size to be measured is obtained by:

said size to be measured=(said second projection width−said first projection width×cos (said second angle−said first angle))/sin (said second angle−said first angle).

14. The method for measuring the thickness of a sample of claim 10, wherein said energy source is at least one of an electron beam and an electromagnetic wave.

15. The method for measuring the thickness of a sample of claim 10, wherein said sample is not destroyed when said second projection width and said first projection width are obtained as well as when said size to be measured are indirectly obtained.

16. The method for measuring the thickness of a sample of claim 10, wherein both said second angle and said first angle are default values.

17. The method for measuring the thickness of a sample of claim 10, wherein both said second projection width and said first projection width are optimized values.

18. The method for measuring the thickness of a sample of claim 10, wherein said second angle is not greater than 15 degrees.

19. The method for measuring the thickness of a sample of claim 10, wherein a transmission electron microscope (TEM) is used to obtain said second projection width and said first projection width.

* * * * *